Reissued Apr. 13, 1943 Re. 22,300

UNITED STATES PATENT OFFICE 22,300

VULCANIZATION OF RUBBER

Paul C. Jones, Silver Lake, and Roger A. Mathes, Akron, Ohio, assignors to The B. F. Goodrich Company, New York, N. Y., a corporation of New York No Drawing. Original No. 2,288,194, dated June 30, 1942, Serial No. 255,358, February 8, 1939. Application for reissue November 6, 1942, Serial No. 464,831
21 Claims. (Cl. 260—787)

This invention relates to the vulcanization of rubber and to rubber compositions vulcanized in the presence of the accelerators herein described.

It has long been known that rubber may be vulcanized in reduced times in the presence of materials commonly called accelerators. It is an object of this invention to provide a new and exceedingly effective class of accelerators. A further object is to produce rubber compositions having high tensile strength and relatively low elongation.

It has been previously observed that the class of compounds known as 2-mercaptothiazolines, of which the simplest member has the structural formula

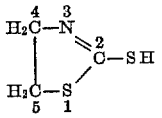

are poor accelerators of vulcanization. This was unexpected in view of their structural similarity to the mercaptothiazoles, which are among the best accelerators known.

We have discovered, however, that in the presence of a member of the class consisting of monocarboxylic acids and metallic salts thereof, 2-mercaptothiazolines are excellent accelerators of vulcanization. Besides 2-mercaptothiazoline, related compounds wherein one or more of the hydrogens on the carbon atoms is replaced by aliphatic or aromatic groups may be employed in connection with the monocarboxylic acids or their metallic salts to accelerate the vulcanization of rubber. Such compounds as 2-mercapto 4-methylthiazoline; 2-mercapto 5-methylthiazoline; 2-mercapto 4-phenylthiazoline; 2-mercapto 4-methoxymethylthiazoline; 2-mercapto 4-anisylthiazoline; 2-mercapto 4-chlormethylthiazoline; 2-mercapto 4-(p-amino) phenylthiazoline; 2-mercapto 4,4-diethylthiazoline; 2-mercapto 4,5-dimethylthiazoline; 2-mercapto 4,5-tetramethylenethiazoline; and similar compounds are within the scope of this invention. It has also been found that the metallic salts function in the same manner as the thiazolines themselves. This was to be expected, for during vulcanization the metallic salt could break down to form the mercaptothiazoline, or the mercaptothiazoline could react with any metallic groups in the composition to form the salt. Any metallic salts such as the sodium, potassium, calcium, barium, magnesium, tin, lead, zinc, mercury, cadmium and other alkali, alkaline earth and heavy metal salts of 2-mercaptothiazoline or its substitution products in which one or more of the hydrogens on the carbon atoms are replaced by aliphatic or aromatic groups may be employed. In its broadest scope, accordingly, the invention consists in vulcanizing rubber in the presence of a monocarboxylic acid or a metallic salt thereof and a compound containing the structure

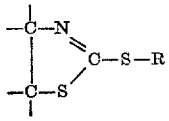

wherein R represents hydrogen or a combined metal.

As an illustration of the effectiveness of 2-mercaptothiazoline when employed in accordance with the method of this invention, the following compositions were prepared:

| Composition | A | B | C | D | E | F |
|---|---|---|---|---|---|---|
| Rubber | 100 | 100 | 100 | 100 | 100 | 100 |
| Zinc oxide | 5 | 5 | 5 | 5 | 5 | 5 |
| Sulfur | 3 | 3 | 3 | 3.5 | 3.5 | 3.5 |
| 2-mercaptothiazoline | 1 | 1 | 1 | 1 | 1 | 1 |
| Stearic acid | 1 | 3 | 0 | 0 | 0 | 0 |
| Lauric acid | 0 | 0 | 3 | 3 | 0 | 0 |
| Zinc stearate | 0 | 0 | 0 | 0 | 3 | 0 |
| Benzoic acid | 0 | 0 | 0 | 0 | 0 | 3 |

After the rubber stocks thus compounded were cured by heating in a mold for varying times and temperatures, the vulcanized compositions had the following properties, T signifying tensile strength at break in lbs./in.$^2$ and E signifying the ultimate elongation in percent.

| Cure, time in min. | Temp. deg. F. | Composition | | | | | |
|---|---|---|---|---|---|---|---|
| | | A | | B | | C | |
| | | T | E | T | E | T | E |
| 30 | 220 | 895 | 1140 | 1225 | 1000 | 1710 | 1000 |
| 60 | 220 | 2020 | 1000 | 2825 | 930 | 2825 | 865 |
| 90 | 220 | 2275 | 900 | 3300 | 840 | 3230 | 815 |
| 120 | 220 | 2795 | 895 | 3965 | 840 | 3500 | 765 |
| 30 | 260 | 3055 | 845 | 3770 | 785 | 4025 | 770 |
| 60 | 260 | 3730 | 785 | 4385 | 725 | 4510 | 705 |
| 90 | 260 | 4025 | 780 | 4245 | 695 | 4020 | 645 |
| 120 | 260 | 4105 | 765 | 4040 | 675 | 3870 | 630 |
| | | D | | E | | F | |
| | | T | E | T | E | T | E |
| 10 | 287 | 3105 | 840 | 2535 | 880 | ------- | ------- |
| 20 | 287 | 3490 | 775 | 3000 | 805 | ------- | ------- |
| 30 | 287 | 3795 | 740 | 3420 | 775 | 4250 | 735 |
| 45 | 287 | 3485 | 700 | 3435 | 740 | ------- | ------- |
| 60 | 287 | 3205 | 665 | 3755 | 740 | 4220 | 690 |

It will be observed that excellent tensile strengths were obtained by using the accelerators of this invention, and that tight cures were obtained as is shown by the relatively low elongations of the well-cured stocks. In spite of the great activity exhibited by the mercaptothiazolines in the presence of the monocarboxylic acids and their metallic salts, it was found that 2-mercaptothiazoline alone produced compositions having tensile strengths of only about 2000 lbs./in.$^2$ even when the compositions were cured for 135 min. at 287° F. It is obvious that mercaptothizolines possess unexpected accelerating activity when used in accordance with the method of this invention.

As an illustration of a specific embodiment of this invention wherein a metallic salt was employed, the following compositions were prepared:

| | Composition | | |
|---|---|---|---|
| | A | B | C |
| Rubber | 100 | 100 | 100 |
| Zinc oxide | 5 | 5 | 5 |
| Sulfur | 3.5 | 3.5 | 3.5 |
| Zinc salt of 2-mercaptothiazoline | 1 | 1 | 1 |
| Lauric acid | 0 | 3 | 0 |
| Zinc stearate | 0 | 0 | 2.13 |

When these compositions were cured in a heated mold for varying times at 287° F., compositions having the following characteristics were obtained, T signifying tensile strength in lbs./in.$^2$ and E signifying the ultimate elongation in percent.

| Time of cure in min. at 287° F. | Composition | | | | | |
|---|---|---|---|---|---|---|
| | A | | B | | C | |
| | T | E | T | E | T | E |
| 20 | 1715 | 950 | 3645 | 805 | 3110 | 860 |
| 45 | 2220 | 915 | 3945 | 730 | 3540 | 805 |
| 60 | 2380 | 905 | 3665 | 690 | 3510 | 775 |

It will be observed that while the metallic salt of the mercaptothiazoline was a poor accelerator when used alone, it possessed great activity when used in the presence of a monocarboxylic acid or a metallic salt of a monocarboxylic acid.

In addition to showing great activity at vulcanizing temperatures, certain members of this new class of accelerators, especially the zinc salts of the 2-mercaptothiazolines, exhibit excellent delayed action. Thus, if 2-mercaptothiazoline is used as the accelerator in Composition B, it forms a rather scorchy compound which attains a tensile strength of about 1,700 lbs./in.$^2$ in 30 minutes at 220° F. This makes the processing of the stock rather difficult. On the other hand, Composition B containing the zinc salt of 2-mercaptothiazoline does not cure at all in 30 minutes at 220° F. and only reaches a tensile strength of about 1,300 lbs./in.$^2$ in 60 minutes at 220° F. This inactivity at processing temperature does not extend into the curing range, however, as can be seen by the curing characteristics of composition B at 287° F.

As further embodiments of the method of this invention, different accelerators were included in the following base recipe:

| | |
|---|---|
| Rubber | 100 |
| Zinc oxide | 5 |
| Sulfur | 3.5 |
| Lauric acid | 3 |
| Accelerator | 1 |

When the compositions were vulcanized, products having the following characteristics were obtained:

| Time of cure in min. at 287° F. | Salt of 2-mercaptothiazoline used | | | | | | | | | |
|---|---|---|---|---|---|---|---|---|---|---|
| | Zinc salt | | Lead salt | | Tin salt | | Magnesium salt | | Calcium salt | |
| | T | E | T | E | T | E | T | E | T | E |
| 30 | 4380 | 770 | 3540 | 765 | 3700 | 790 | 3150 | 845 | 3570 | 790 |
| 60 | 3985 | 705 | 3520 | 740 | 3730 | 750 | 3570 | 810 | 3630 | 745 |

Any of the other metallic salts of 2-mercaptothiazolines may likewise be used as accelerators in accordance with the method of this invention. The alkali metal salts are valuable compounds in that they are soluble in water, and may accordingly be used to advantage in compounding latex, it being possible to keep the latex indefinitely without the accelerator precipitating therefrom.

It will be observed that many of the compositions within the scope of this invention contain zinc oxide, a 2-mercaptothiazoline, and a fatty acid. It has been found that these compounds may be reacted before incorporation in the rubber to form mixed zinc salts of fatty acids and 2-mercaptothiazolines containing the structure

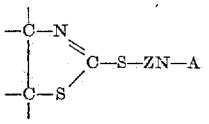

wherein A is a fatty acid group. This modification of the invention is advantageous because the relatively high-melting zinc salts of 2-mercaptothiazolines are sometimes rather difficult to disperse, while the lower-melting mixed zinc salts of a 2-mercaptothiazoline and a saturated or unsaturated fatty acid, preferably one containing eight or more carbon atoms, have equivalent accelerating activity and are easily dispersed in rubber.

The mixed zinc salts of 2-mercaptothiazolines and fatty acids may be prepared by reacting a fatty acid, zinc oxide and a 2-mercaptothiazoline in a 1 : 1 : 1 ratio, one mole of water being split off. Thus, 8.1 parts by weight of zinc oxide, 28.4 parts of stearic acid, and 11.9 parts of 2-mercaptothiazoline are reacted by stirring and heating the melted reactants until 1.8 parts of water are given off and a homogeneous mixture is obtained. The mixed salts are in general soap-like materials which melt below 120° C., and are much more easily dispersed in rubber than the higher-melting zince salts of mercaptothiazolines. The zinc salt of 2-mercaptothiazoline, for instance, from which the foregoing accelerator was prepared melted at about 235° C., while the mixed salt melted at or about 115°–120° C.

To demonstrate the effectiveness of the accelerators of this invention, the following compositions were prepared:

| | Composition | | | |
|---|---|---|---|---|
| | A | B | C | D |
| Rubber | 100 | 100 | 100 | 100 |
| Zinc oxide | 5 | 5 | 5 | 5 |
| Sulfur | 3.5 | 3.5 | 3.5 | 3.5 |
| Mixed zinc salt of 2-mercaptothiazoline and caprylic acid | 2.18 | 0 | 0 | 0 |
| Mixed zinc salt of 2-mercaptothiazoline and stearic acid | 0 | 3.13 | 0 | 0 |
| Mixed zinc salt of 2-mercaptothiazoline and lauric acid | 0 | 0 | 2.56 | 0 |
| Mixed zinc salt of 2-mercaptothiazoline and cottonseed fatty acid | 0 | 0 | 0 | 3.13 |

Good dispersions of all of the above accelerators in the rubber compositions were obtained with ease.

The characteristics of the above compositions cured for varying times at 287° F. were as follows, T signifying tensile strength at break in lbs./in. and E signifying ultimate elongation in per cent:

| Min. of cure | Composition | | | | | | | |
|---|---|---|---|---|---|---|---|---|
| | A | | B | | C | | D | |
| | T | E | T | E | T | E | T | E |
| 30 | 3145 | 855 | 3450 | 815 | 3210 | 855 | 3265 | 815 |
| 45 | 3510 | 840 | 3770 | 800 | 3335 | 820 | 3215 | 800 |
| 60 | 3535 | 815 | 3640 | 765 | 3405 | 805 | 3515 | 805 |

It will be observed that all of the materials tested were good accelerators of vulcanization.

Any of the saturated or unsaturated monocarboxylic acids such as caprylic, palmitic, oleic, ricinoleic, benzoic, salicylic, toluic, or other like acids or their salts with metals such as lead, tin, sodium, cobalt, nickel, calcium, magnesium, and other alkali, alkaline earth, and heavy metals may be employed in place of the materials used in the specific examples. While the lower fatty acids may be employed if desired, it is preferable to employ their metallic salts, zinc acetate for instance, which are solids. The acids or their metallic salts may be present in any desired small proportions, even minute quantities usually having a beneficial effect. For the best results however, they should be included in the compositions in amounts varying from 1 to 5% or more.

It is a remarkable and unusual property of the materials of this invention that they are activated by such materials as benzoic acid and salicylic acid which are widely used retarders for other accelerators. Referring to the table above, it will be seen that at the two cures at which compositions containing the material were tested, benzoic acid was a better activator than any of the other acids or salts employed. This unexpected result indicates that mercaptothiazolines possess properties not shared by other accelerators of vulcanization.

Although the use of the accelerators of this invention has been described in detail in connection with specific rubber compositions, it will be evident that this invention is applicable to rubber compositions of the most varied nature, and that all manner of rubber goods including pneumatic and solid rubber tires, tubes, hose, belting, packing, boots and shoes, surgical rubber goods, seamless dipped rubber articles, etc. may be vulcanized in the presence of the accelerators herein described. The accelerator may be incorporated in the rubber by mastication, milling or any similar process, or in the case of latex, rubber cement, or any other natural or artificial dispersion or solution of rubber, by simply dissolving or suspending the accelerator therein.

The vulcanization may be performed in other manners than that particularly set forth in the specific examples; specifically, rubber compositions may be heated in the presence of sulfur or selenium in hot air, steam, hot water, etc.

It is to be understood that the term "a rubber" is employed in the appended claims in a generic sense to designate those rubbery materials which are vulcanizable with sulfur, including caoutchouc, balata, gutta percha, latex, rubber isomers, or synthetic rubber whether or not admixed with pigments, fillers, softeners, antioxidants, other accelerators, etc., but not including materials incapable of vulcanization by reaction with sulfur.

While we have herein disclosed specific embodiments of our invention, we do not intend to limit ourselves solely thereto, for it will be obvious to those skilled in the art that many modifications such as using other materials having equivalent properties and varying the proportions of materials used are within the spirit and scope of the invention as defined in the appended claims.

We claim:

1. The process which comprises vulcanizing a rubber in the presence of a member of the class consisting of 2-mercaptothiazolines and salts thereof in which a metal is combined solely with the acid radicals thereof, and a member of the class consisting of monocarboxylic acids and their metallic salts.

2. The process which comprises vulcanizing a rubber in the presence of a 2-mercaptothiazoline and a member of the class consisting of monocarboxylic acids and their metallic salts.

3. The process which comprises vulcanizing a rubber in the presence of 2-mercaptothiazoline and a monocarboxylic acid.

4. A rubber composition comprising a rubber which has been vulcanized in the presence of a 2-mercaptothiazoline and a member of the class consisting of monocarboxylic acids and their metallic salts.

5. A rubber composition comprising a rubber which has been vulcanized in the presence of 2-mercaptothiazoline and a member of the class consisting of monocarboxylic acids and their metallic salts.

6. The process which comprises vulcanizing a rubber in the presence of a metallic salt in which the metal is combined solely with the acid radicals of 2-mercaptothiazolines, and a member of the class consisting of monocarboxylic acids and their metallic salts.

7. The process which comprises vulcanizing a rubber in the presence of a salt consisting of zinc combined solely with the acid radicals of 2-mercaptothiazolines, and a member of the class consisting of monocarboxylic acids and their metallic salts.

8. The process which comprises vulcanizing a rubber in the presence of the zinc salt of 2-mercaptothiazoline and a member of the class consisting of monocarboxylic acids and their metallic salts.

9. A rubber composition comprising a rubber which has been vulcanized in the presence of a metallic salt in which the metal is combined solely with the acid radicals of 2-mercaptothiazolines, and a member of the class consisting of monocarboxylic acids and their metallic salts.

10. A rubber composition comprising a rubber which has been vulcanized in the presence of a salt consisting of zinc combined solely with the acid radicals of 2-mercaptothiazolines, and a member of the class consisting of monocarboxylic acids and their metallic salts.

11. A rubber composition comprising a rubber which has been vulcanized in the presence of the zinc salt of 2-mercaptothiazoline and a member of the class consisting of monocarboxylic acids and their metallic salts.

12. The process which comprises vulcanizing a rubber in the presence of a 2-mercaptothiazoline and a fatty acid.

13. The process which comprises vulcanizing a rubber in the presence of a 2-mercaptothiazoline and a metallic salt of a fatty acid.

14. The process which comprises vulcanizing a rubber in the presence of a fatty acid and a metallic salt in which the metal is combined solely with the acid radicals of 2-mercaptothiazolines.

15. The process which comprises vulcanizing a rubber in the presence of a fatty acid and a salt consisting of zinc combined solely with the acid radicals of 2-mercaptothiazolines.

16. The process which comprises vulcanizing a rubber in the presence of 2-mercaptothiazoline and a fatty acid.

17. The process which comprises vulcanizing a rubber in the presence of 2-mercaptothiazoline and the zinc salt of a fatty acid.

18. The process which comprises vulcanizing a rubber in the presence of a fatty acid and the zinc salt of 2-mercaptothiazoline.

19. A rubber composition comprising a rubber which has been vulcanized in the presence of a fatty acid and a metallic salt in which the metal is combined solely with the acid radicals of 2-mercaptothiazolines.

20. A rubber composition comprising a rubber which has been vulcanized in the presence of a fatty acid and a salt consisting of zinc combined solely with the acid radicals of 2-mercaptothiazolines.

21. A rubber composition comprising a rubber which has been vulcanized in the presence of a 2-mercaptothiazoline and a fatty acid.

PAUL C. JONES.
ROGER A. MATHES.